(12) United States Patent
Nie et al.

(10) Patent No.: US 11,085,992 B2
(45) Date of Patent: Aug. 10, 2021

(54) SYSTEM AND METHOD FOR POSITIONING A TERMINAL DEVICE

(71) Applicant: BEIJING DIDI INFINITY TECHNOLOGY AND DEVELOPMENT CO., LTD., Beijing (CN)

(72) Inventors: Xianglong Nie, Beijing (CN); Weihuan Shu, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/729,603

(22) Filed: Dec. 30, 2019

(65) Prior Publication Data
US 2020/0132799 A1 Apr. 30, 2020

Related U.S. Application Data

(63) Continuation of application No. PCT/CN2017/091333, filed on Jun. 30, 2017.

(51) Int. Cl.
*G01S 5/02* (2010.01)

(52) U.S. Cl.
CPC .......... *G01S 5/0278* (2013.01); *G01S 5/0252* (2013.01)

(58) Field of Classification Search
CPC ............. G01S 5/02522; G01S 5/02585; G01S 5/0278; G01S 5/0294; G01S 5/0252
See application file for complete search history.

(56) References Cited

U.S. PATENT DOCUMENTS

| 2009/0039871 A1* | 2/2009 | Laforest ................. G01V 3/081 324/207.11 |
|---|---|---|
| 2011/0018709 A1 | 1/2011 | Kornbluh |
| 2011/0302116 A1 | 12/2011 | Ide et al. |
| 2012/0306690 A1 | 12/2012 | Yule et al. |
| 2013/0311084 A1 | 11/2013 | Lundquist et al. |

(Continued)

FOREIGN PATENT DOCUMENTS

| CN | 101651886 A | 2/2010 |
|---|---|---|
| CN | 106595633 A | 4/2017 |
| EP | 2530487 A1 | 12/2012 |

OTHER PUBLICATIONS

International Search Report in PCT/CN2017/091333 dated Feb. 24, 2018, 4 pages.

(Continued)

*Primary Examiner* — Dao L Phan
(74) *Attorney, Agent, or Firm* — Finnegan, Henderson, Farabow, Garrett & Dunner, L.L.P.

(57) ABSTRACT

Systems and methods for positioning a terminal device are disclosed. The method may include determining, by a positioning device, a first position of the terminal device in an area at a first time point; determining, by the positioning device, a second position of the terminal device in the area at a second time point; determining, by the positioning device, a plurality of hypothetical positions of the terminal device at a third time point; and providing, by the positioning device, a third position of the terminal device at the third time point, based on the first position, the second position, and the hypothetical positions using a transition model.

16 Claims, 7 Drawing Sheets

(56) References Cited

U.S. PATENT DOCUMENTS

| | | | |
|---|---|---|---|
| 2014/0099978 A1* | 4/2014 | Egner | H04W 4/029 455/456.6 |
| 2014/0257766 A1 | 9/2014 | Poduri et al. | |
| 2015/0181553 A1 | 6/2015 | Segev | |
| 2015/0226577 A1 | 8/2015 | Le Grand et al. | |
| 2016/0171017 A1* | 6/2016 | Li | G06F 16/583 382/195 |
| 2017/0108574 A1 | 4/2017 | Cox et al. | |

OTHER PUBLICATIONS

Written Opinion in PCT/CN2017/091333 dated Feb. 24, 2018, 4 pages.
First Office Action in Chinese Application No. 201780091496.X dated Aug. 13, 2020, 17 pages.

* cited by examiner

200

SYSTEM AND METHOD FOR POSITIONING A TERMINAL DEVICE

CROSS-REFERENCE TO RELATED APPLICATION

The application is a continuation of International Application No. PCT/CN2017/091333, filed on Jun. 30, 2017, which is incorporated herein by reference in its entirety.

TECHNICAL FIELD

The present disclosure relates to positioning a terminal device, and more particularly, to systems and methods for positioning a terminal device based on a trajectory thereof.

BACKGROUND

Terminal devices, such as mobile phones, wearables, may be positioned by various positioning techniques, including Global Positioning System (GPS), base stations, Wireless Fidelity (WiFi) access points, and Bluetooth access points. The positioning accuracy is typically less than five meters via GPS, about 100-1000 meters via the base stations, and around 10-50 meters via the WiFi or Bluetooth access points. That is, GPS positioning tends to have a better accuracy in an outdoor environment. In an indoor environment, however, GPS signals are usually too weak for positioning a terminal device. The terminal device may have to be positioned according to signals of access points (AP), such as Wireless Fidelity (WiFi) APs, Bluetooth APs, and base stations. For example, the terminal device may scan nearby WiFi APs, and may be positioned based on the scanned signals of the WiFi APs.

However, as discussed above, the accuracy of positioning results based on the APs is about dozens or even hundreds of meters, and is unsatisfactory.

Thus, embodiments of the disclosure provide an improved system and method for positioning a terminal device.

SUMMARY

An aspect of the disclosure provides a computer-implemented method for positioning a terminal device. The method may include determining, by a positioning device, a first position of the terminal device in an area at a first time point; determining, by the positioning device, a second position of the terminal device in the area at a second time point; determining, by the positioning device, a plurality of hypothetical positions of the terminal device at a third time point; and providing, by the positioning device, a third position of the terminal device at the third time point, based on the first position, the second position, and the hypothetical positions using a transition model.

Another aspect of the disclosure provides a system for positioning a terminal device. The system may include a memory configured to store a transition model; and a processor configured to determine a first position of the terminal device in an area at a first time point; determine a second position of the terminal device in the area at a second time point; determine a plurality of hypothetical positions of the terminal device at a third time point; and provide a third position of the terminal device at the third time point, based on the first position, the second position, and the hypothetical positions using the transition model.

Another aspect of the disclosure provides a non-transitory computer-readable medium that stores a set of instructions. When executed by at least one processor of a positioning system, the set of instructions cause the positioning system to perform a method for establishing a transition model for determining a position of a device, the method including determining a first position of the terminal device in an area at a first time point; determining a second position of the terminal device in the area at a second time point; determining a plurality of hypothetical positions of the terminal device at a third time point; and providing a third position of the terminal device at the third time point, based on the first position, the second position, and the hypothetical positions using a transition model.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
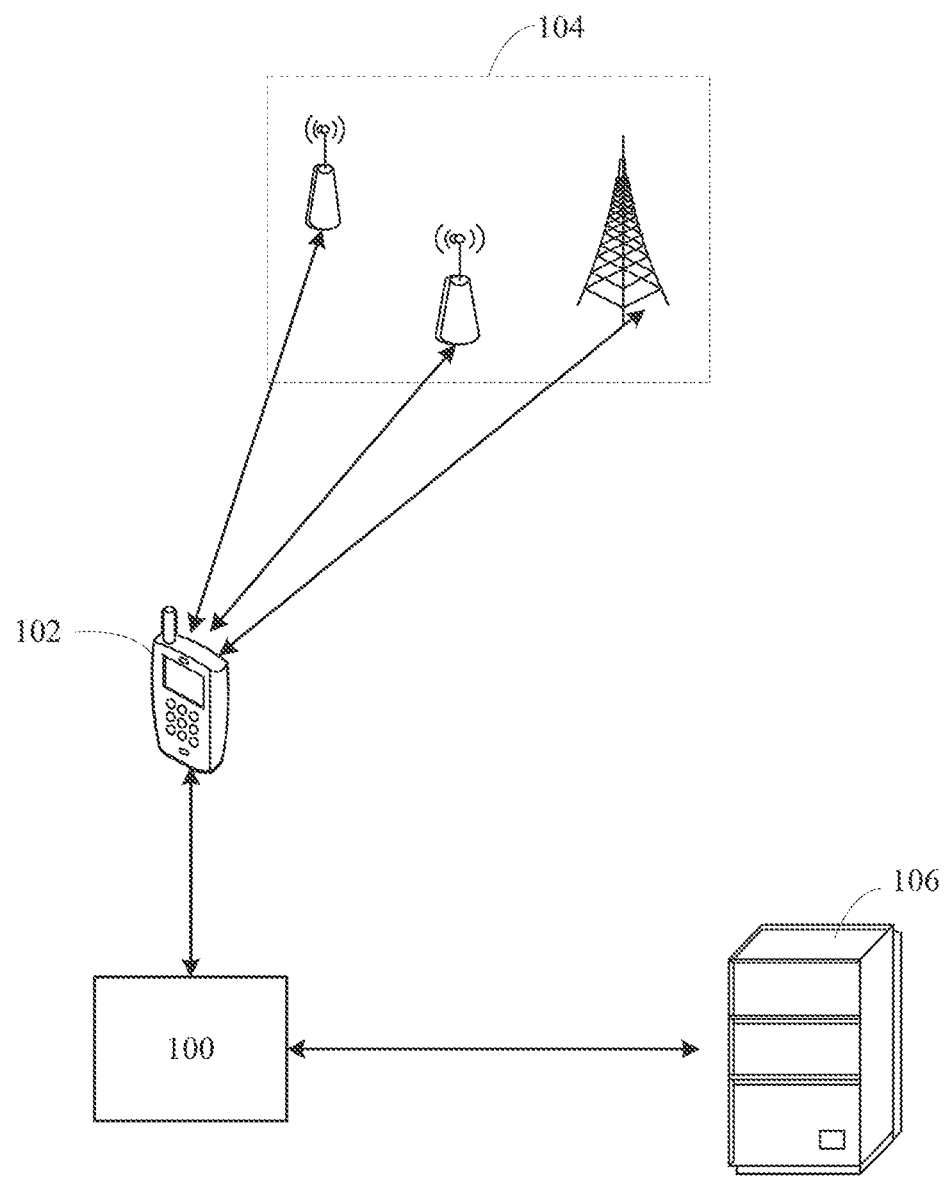
FIG. 1 illustrates a schematic diagram of an exemplary system for positioning a terminal device, according to some embodiments of the disclosure.

FIG. 1 illustrates a schematic diagram of an exemplary system for positioning a terminal device, according to some embodiments of the disclosure. System 100 may be a general server or a proprietary positioning device. Terminal devices 102 may include any electronic device that can scan APs 104 and communicate with system 100. For example, terminal devices 102 may include a smart phone, a laptop, a tablet, or the like.

As shown in FIG. 1, terminal devices 102 may scan nearby APs 104. APs 104 may include devices that transmit signals for communication with terminal devices. For example, APs 104 may include WiFi access points, a base station, Bluetooth access points, or the like. In some embodiments, terminal devices 102 may be preliminarily positioned by WiFi access points. For example, terminal device 102 may receive signals from WiFi APs, for which a positioning fingerprint may be generated by each of terminal devices 102. The positioning fingerprint include feature information associated with the APs, such as identifications (e.g., names, MAC addresses, or the like), Received Signal Strength Indication (RSSI), Round Trip Time (RTT), or the like of APs 104. RSSI and RTT can be used to determine the distance between a terminal device and each AP. The positioning fingerprint may be further used for preliminarily positioning each of terminal devices 102.

The positioning fingerprint may be transmitted to system 100 and used to retrieve positions of APs 104 from a positioning server 106. Positioning server 106 may be an internal server of system 100 or an external server. Positioning server 106 may include a position database that stores positions of APs 104. The position database may store positions of APs 104.

After the positioning fingerprints are received, positioning server 106 may determine the preliminary positions of terminal devices 102 based on the positioning fingerprints and the stored positions of APs 104. The preliminary positions of each terminal device 102 can be determined according to, for example, a triangle positioning method, an Angle of Arrival (AOA) method, a Time of Arrival (TOA) method, a Time Difference of Arrival (TDOA) method, or the like. The preliminary positions are not accurate positions for the terminal devices, and may be referred to as "hypothetical positions."

Figure 2:
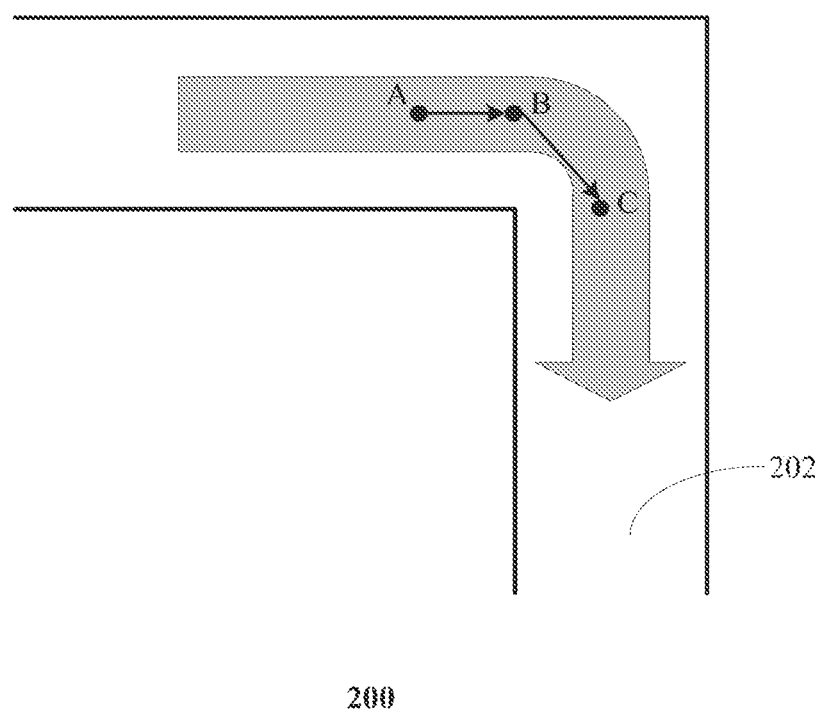
FIG. 2 illustrates an exemplary trajectory of a terminal device within an indoor environment, according to some embodiments of the disclosure.

When a user carrying terminal device 102 moves, a trajectory of terminal device 102 may be further determined. In an indoor environment, such as a shopping mall, trajectories of terminal devices moving within an area may be statistically similar. FIG. 2 illustrates an exemplary trajectory of a terminal device within an indoor environment, according to some embodiments of the disclosure.

For example, FIG. 2 shows a path 202 in area 200. Path 202 has a turn to the right due to obstructions around the path. Accordingly, terminal devices will have to follow path 202, and turn right at the corner. That is, when a terminal device 102 moves from point A to point B, it is very likely that terminal device 102 may further move from point B to point C because of the corner. Therefore, a next position at point C is associated with a previous movement vector from point A to point B. In other words, the conditional probability for terminal device 102 to move from point B to point C, given that it moved from point A and point B is high.

Figure 3:
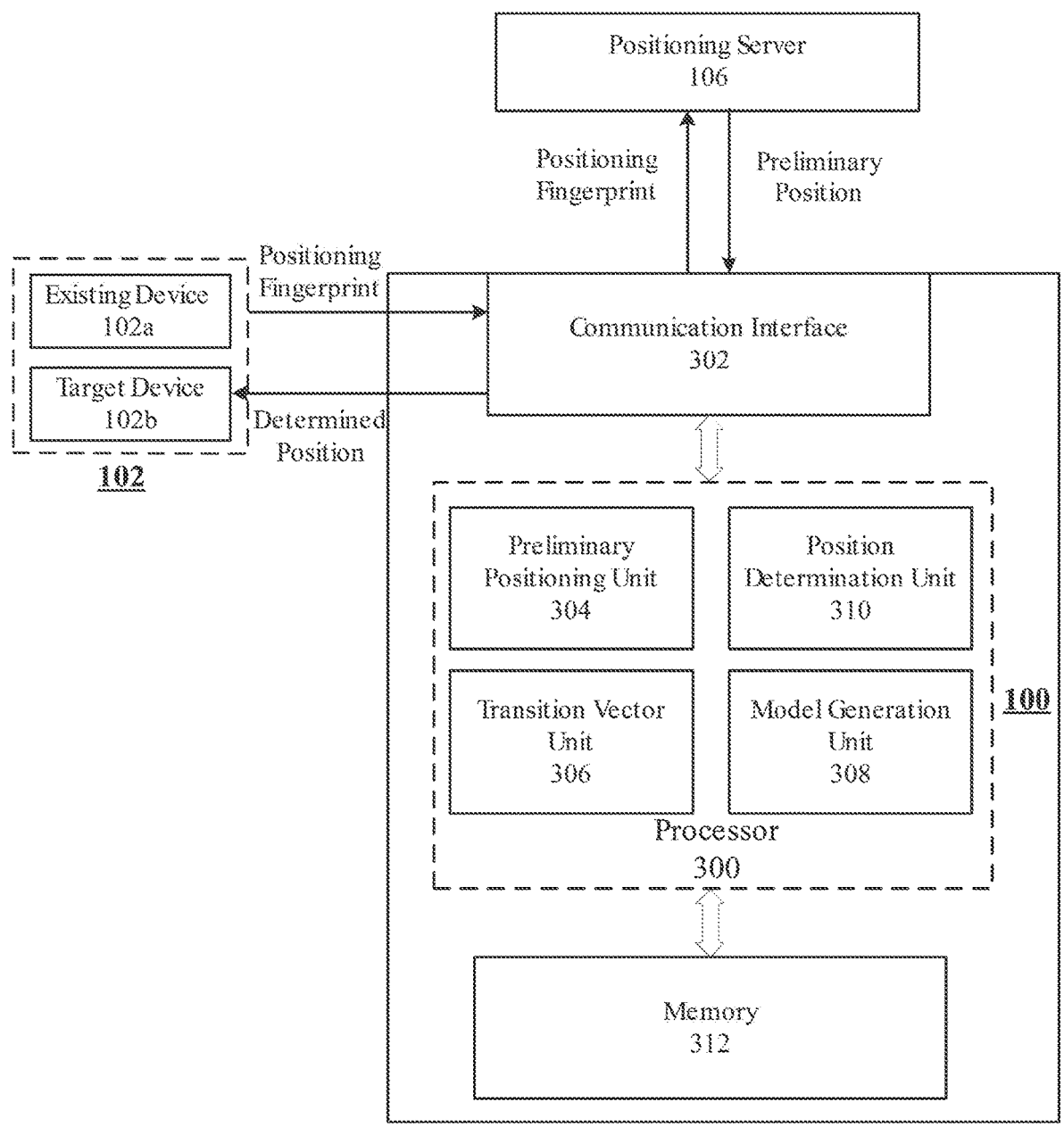
FIG. 3 is a block diagram of an exemplary system for positioning a terminal device, according to some embodiments of the disclosure.

Thus, given trajectories of existing devices, system 100 may identify an association between a next position and a previous movement vector for each existing device, and establish a transition model based on the associations for the existing devices. Consistent with this disclosure, an "existing device" refers to a terminal device that generates a known movement trajectory containing known positions in a certain area. Trajectories of "existing devices" may be used as samples to train the transition model. Once established and trained with sufficient samples, the transition model may be further used for positioning a terminal device based on a trajectory thereof. FIG. 3 is a block diagram of an exemplary system for positioning a terminal device, according to some embodiments of the disclosure.

As shown in FIG. 3, system 100 may include a communication interface 302, a processor 300, and a memory 310. The processor 300 may further include multiple functional modules, such as a preliminary positioning unit 304, a transition vector unit 306, a model generation unit 308, a position determination unit 310. These modules (and any corresponding sub-modules or sub-units) can be functional hardware units (e.g., portions of an integrated circuit) of processor 300 designed for use with other components or a part of a program (stored on a computer-readable medium) that, when executed by processor 300, performs one or more functions. Although FIG. 3 shows units 304-310 all within one processor 300, it is contemplated that these units may be distributed among multiple processors located near or remotely with each other. System 100 may be implemented in the cloud, on terminal device 102, or a separate computer/server.

System 100 may position a terminal device in two stages. In a first stage, also referred to as the "training stage," system 100 may generate and train a transition model using data associated with existing devices; and in a second stage, also referred to as the "positioning stage," system 100 may apply the trained transition model for positioning a terminal device.

Communication interface 302 may establish sessions for communicating with terminal device 102 and positioning server 106. Terminal device 102 may include existing devices 102a or a target device 102b. For example, in the training stage, communication interface 302 may continuously receive positioning information from existing devices 102a. The positioning information may include a series of benchmark positions indicating a known trajectory of each existing device 102a. The series of benchmark positions may be previously determined using methods like GPS positioning. In the positioning stage, communication interface 302 may receive a first positioning fingerprint of target device 102b at a first time point, and a second positioning fingerprint of target device 102b at a second time point. The first and second positioning fingerprints may be further used for positioning terminal devices 102 at a third time point. And after the position of target device 102b is determined at the third time point by system 100, communication interface 302 may further transmit the determined position back to target device 102b. Besides communication with terminal devices 102, communication interface 302 may also communicate with positioning server 106 to transmit received positioning fingerprints of terminal devices 102 to positioning server 106 and receive preliminary positions of the same.

Preliminary positioning unit 304 may determine preliminary positions of terminal devices 102. For example, preliminary positioning unit 304 may determine a first position of target device 102b at a first time point. In some embodiments, when target device 102b is in an outdoor environment, the first position may be determined based on GPS signals. After the first position is determined, target device 102b may be moved into the indoor environment, and a second position of target device 102b may be determined based on positioning fingerprints at a second time point.

Similarly, preliminary positioning unit 304 may also determine hypothetical positions of target device 102b at the third time point.

Figure 4:
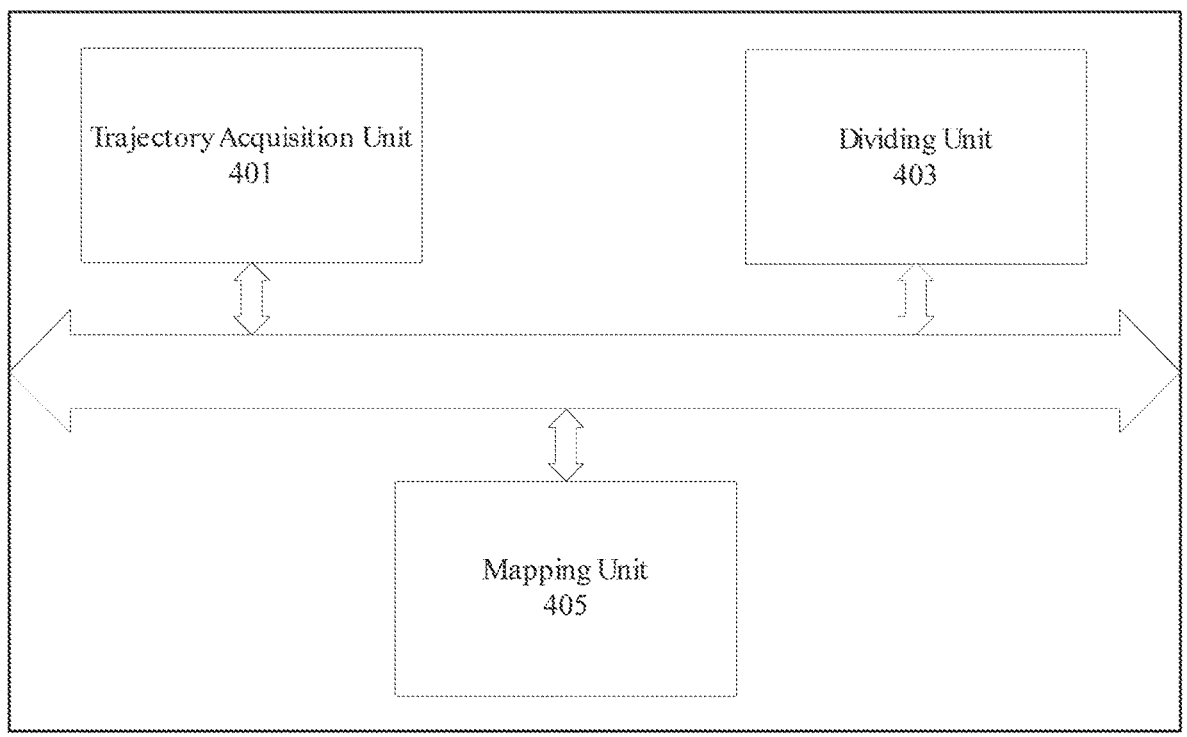
FIG. 4 illustrates an exemplary transition vector unit, according to some embodiments of the disclosure.

Transition vector unit 306 may generate a transition vector, indicating the movement of existing device 102a or target device 102b. Consistent with the disclosure, a "transition vector" is a vector pointing from one point to the next point in time on the trajectory of a terminal device. For example, the terminal device may be at point A $(x1, y1)$ at a first time point, point B $(x2, y2)$ at a second time point, and point C $(x3, y3)$ at a third time point. A first transition vector pointing from point A to point B is therefore $V1=(x1, y1)-(x2, y2)$, and a second transition vector pointing from point A to point B is $V2=(x2, y2)-(x3, y3)$. A trajectory may be represented by a plurality of transition vectors. FIG. 4 illustrates an exemplary transition vector unit, according to some embodiments of the disclosure.

As shown in FIG. 4, in some embodiments, transition vector unit 306 may include a trajectory acquisition unit 401, a dividing unit 403, and a mapping unit 405.

Trajectory acquisition unit 401 may acquire a trajectory of terminal device 102 in an area. In some embodiments, the trajectory may be estimated according to a starting position and Pedestrian Dead reckoning (PDR) data. As discussed above, the first position may be determined based on the GPS signals, therefore the first position may be determined as the starting point of the trajectory. In some embodiments, other positions determined by other methods may also be determined as a starting point. A movement of existing device 102a may be determined based on the PDR data. The PDR data may be received from at least one of an accelerometer, a gyroscope, an electronic compass, a barometer, or the like of terminal device 102. Based on the starting position and the movement of terminal device 102, the trajectory may be estimated. Any other method for estimating a trajectory of a terminal device may be utilized.

In some embodiment, trajectories for existing devices 102a may be stored in a trajectory database, and trajectory acquisition unit 401 may acquire the trajectories from the trajectory database. It is contemplated that, trajectory acquisition unit 401 may acquire a trajectory for existing device 102a or target device 102b.

Figure 5A:
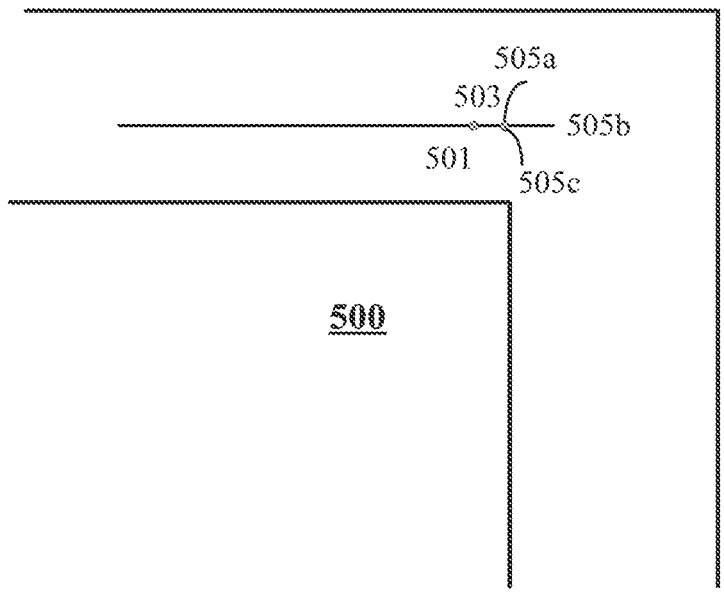
FIGS. 5A and 5B illustrate exemplary trajectories of terminal devices in an area, according to some embodiments of the disclosure.
Figure 5B:
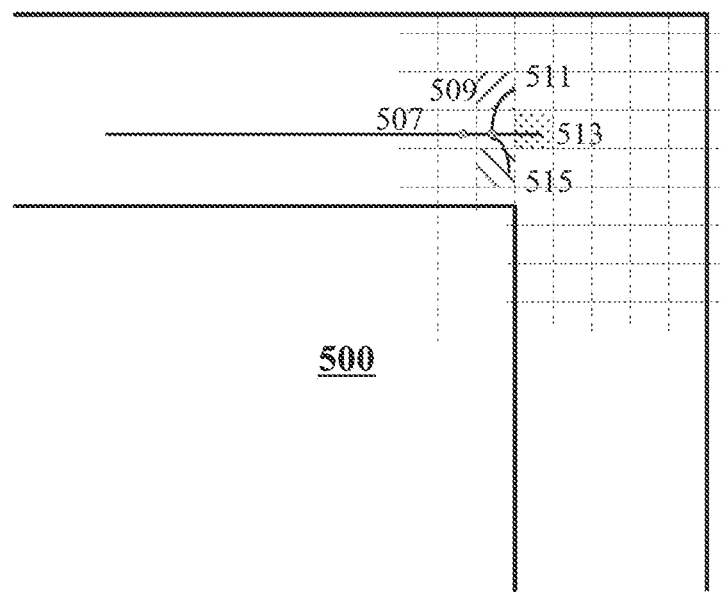

FIGS. 5A and 5B illustrate exemplary trajectories of terminal devices in an area, according to some embodiments of the disclosure.

Trajectories may pass through same positions. For example, as shown in FIG. 5A, in area 500, a first trajectory starts from a first position 501 at a first time point and moves to a second position 503 at a second time point, and then moves to a third position 505a at a third time point. Similarly, a second trajectory moves from first position 501 to second position 503, and then moves to a third position 505b. It is contemplated that, though the first and second trajectories both pass through same positions (e.g., the first or second position), the first and second trajectories may pass through it at different time points or at a same time point. Similarly, a third trajectory passes through both first and second positions 501 and 503, and further moves to a third position 505c. That is, each trajectory may include a first known position, a second known position, and a third known position.

Dividing unit 403 may divide area 500 into blocks, after the trajectories of existing devices 102a have been acquired, as shown in FIG. 5B. Each block may include a position. FIG. 5B merely illustrates blocks for a portion of area 500 as an example.

Mapping unit 405 may map the trajectories onto the blocks, so that transition vectors of the trajectories may be defined using the blocks. For example, the transition vector of the first trajectory in area 500 may be defined by blocks 507, 509, and 511, the transition vector of the second trajectory in area 500 may be defined by blocks 507, 509, and 513, and the transition vector of the third trajectory in area 500 may be defined by blocks 507, 509, and 515.

In some embodiments, the third blocks include adjacent blocks of the second block. Furthermore, the adjacent blocks can include four-adjacent blocks of the second block, as shown in FIG. 5B. Thus, as a next position for second block 509, the third block may be any of blocks 507, 511, 513, and 515. That is, first position 501 may correspond to block 507, second position 503 may correspond to block 509, and third positions 505a, 505b, and 505c may correspond to blocks 511-515.

It is contemplated that more trajectories may pass both first and second blocks 507 and 509 and further move to any of third blocks 511-515. Therefore, a probability for a trajectory to pass through each of the third blocks can be different, and can be determined by performing statistics on the trajectories.

With reference back to FIG. 3, model generation unit 308 may generate and train a transition model based on the known trajectories of existing devices 102a. A "transition model," consistent with the present disclosure, transfer one transition vector to another. For instance, a transition model may be a transition matrix T that satisfies V1*T=V2, where V1=(x1, y1)−(x2, y2), and V2=(x2, y2)−(x3, y3). During the training stage, transition model T is trained using known transition vectors V1 and V2, which are determined from known positions of (x1, y1), (x2, y2), and (x3, y3). During the positioning stage, transition model T can be used to predict the position of unknown point C (x3, y3) based on known points A and B.

In some embodiments, as a part of the training stage, model generation unit 308 may determine probabilities of the trajectories moving from the second block to each third block, and generate the transition model based on the probabilities. The probabilities may be determined by dividing a number of trajectories passing each third block by a total number of all trajectories. Therefore, the probabilities indicate the possibilities of a terminal device moving to each third block after moving from the first block to the second block. That is, a next position (e.g., one of third blocks 511-515) is associated with a previous movement vector from the first block to the second block. The transition model may be established based on the association between the probabilities, and stored in memory 312. In some embodiments, the transition model may be generated based on the probabilities using a Markov model.

Besides the probabilities, model generation unit 308 may use additional known information to train the transition mode, for example, using a map of area 500. The map of area 500 may include structural information of area 500. An indoor environment, such as a shopping mall, may include stairs, paths, counters, walls, or the like. In some embodiments, stairs may provide references for positioning a terminal device, positions (or blocks) on paths may have higher confidence values, and a trajectory passing through counters and/or walls may be assigned with lower confidence values.

The transition model may provide associations between a plurality of transition vectors. Given a transition vector from a first position to a second position, the transition model may be used to determine probabilities of next positions.

In the second stage, system 100 may position target device 102b using the transition model.

As discussed above, preliminary positioning unit 304 may determine a first position of target device 102b in an area at a first time point, and a second position of target device 102b in the area at a second time point. Preliminary positioning unit 304 may further determine hypothetical positions of target device 102b at a third time point. Therefore, position determination unit 310 may provide a third position of target device 102b at the third time point based on the first and second positions and the hypothetical positions using the transition model generated and trained by model generation unit 308. Generally, the third position has the highest probability among the hypothetical positions. By selecting a highest probability for a next position, the positioning results for the target device 102b may be improved.

Rather than directly using the first and second positions provided by preliminary positioning unit 304, position determination unit 310 may further determine a confidence value associated with the first and second positions. As discussed above, the positions generated by preliminary positioning unit 304 may not be very accurate and may be deteriorated by many factors. Therefore, position determination unit 310 may further determine whether the confidence value associated with the first and second positions is greater than a predetermined value. If the confidence value is less than the predetermined value, the first and second positions may be discarded, and another pair of positions may be acquired. For example, when the first position is in a shopping mall and the second position jumps to stadium within a short time interval, the confidence value may be determined to be less than the predetermined value and the first and second positions may be discarded.

Above-described system 100 establishes a transition model based on a plurality of trajectories of existing devices, and applies the transition model to position a terminal device based on a trajectory thereof. The accuracy for positioning the terminal device may be improved as system 100 positions the terminal device based on not only currently scanned signals of the APs but also historical trajectories.

Figure 6:
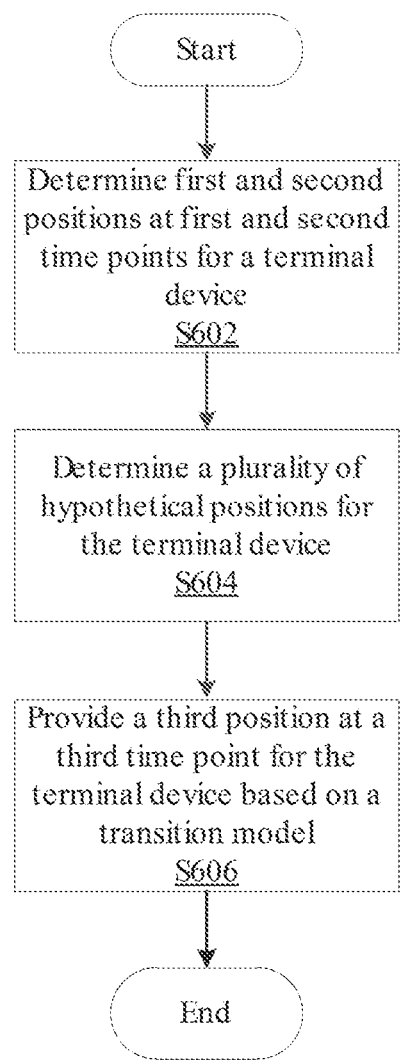
FIG. 6 is a flowchart of an exemplary process for positioning a terminal device, according to some embodiments of the disclosure.

FIG. 6 is a flowchart of an exemplary process for positioning a terminal device, according to some embodiments of the disclosure. For example, process 600 may be implemented by a positioning device to position the terminal device, and may include steps S602-S610.

In step S602, the positioning device may determine a first position of the terminal device in an area at a first time point, and determine a second position of the terminal device in an area at a second time point. The first and second positions may be determined based on GPS signals, Wireless Fidelity (WiFi) access points, Bluetooth APs, and base stations. For example, when the terminal device is moving from an outdoor environment into an indoor environment (e.g., a user carrying the terminal device is walking into a shopping mall), the first position may be determined by the GPS signals, and the second position may be determined by the WiFi APs.

In step S604, the positioning device may determine a plurality of hypothetical positions of the terminal device at a third time point. In some embodiments, when the terminal device enters the indoor environment, the terminal device may be determined by scanning the APs and generate a positioning fingerprint at the third time point. The positioning fingerprint may be used to position the terminal device. For example, the positioning device may transmit the positioning fingerprint to a positioning server, and receive the hypothetical positions.

In step S606, the positioning device may provide a third position of the terminal device at the third time point, based on the first position, the second position, and the hypothetical positions using a transition model. Generally, the third position has the highest probability among the hypothetical positions.

Rather than directly using the first and second positions, the positioning device may further determine confidence value for the first and second positions. If the confidence value is less than a predetermined value, the first and second positions may be discarded, and another pair of positions may be acquired.

Figure 7:
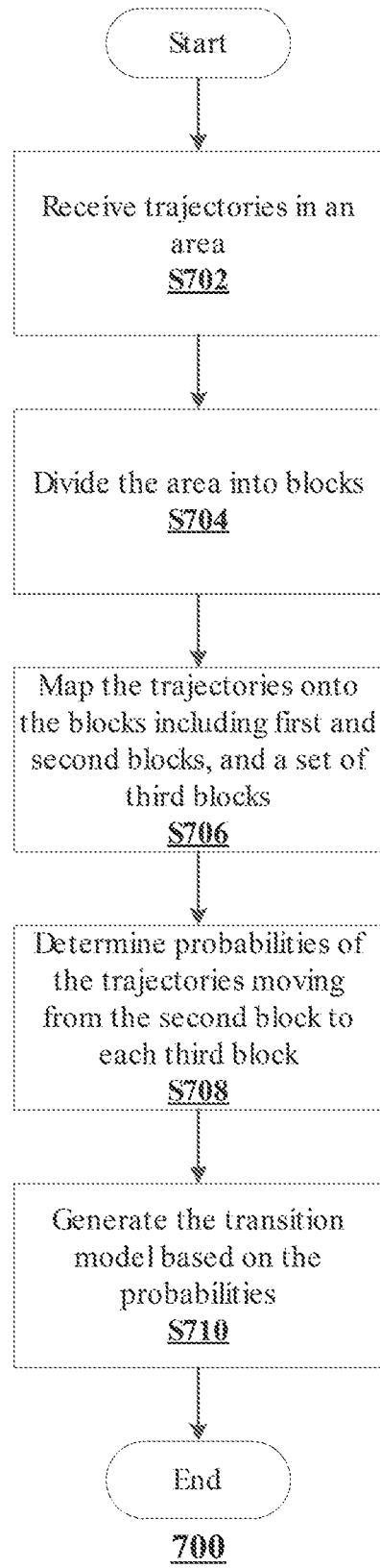
FIG. 7 is a flowchart of an exemplary process for training a transition model, according to some embodiments of the disclosure.

The transition model used in step S606 may be trained using trajectories of existing devices in the area. FIG. 7 is a flowchart of an exemplary process for training a transition model, according to some embodiments of the disclosure. For example, process 700 may include steps S702-S710.

In step S702, the positioning device may receive the trajectories of existing devices in the area. The trajectories of existing devices may be acquired based on a starting position and Pedestrian Dead reckoning (PDR) data. The starting position can be an accurate position determined based on the GPS signals. In some embodiments, the starting position can also be determined based on some indoor positioning methods. For example, the starting position can be determined with reference to referential structures (e.g., a stair) in the indoor environment. A movement of the existing device may be determined based on the PDR data. The PDR data may be received from at least one of an accelerometer, a gyroscope, an electronic compass, a barometer, or the like of the existing device. Based on the starting position and the movement of the existing device, the trajectory may be estimated. Each trajectory may include a first known position, a second known position, and a third known position.

In some embodiment, the positioning device may also acquire the trajectories of the existing devices from a trajectory database, as the trajectories may be stored in a trajectory database.

In step S704, the positioning device may divide the area into blocks, so that transition vectors of the trajectories may be defined by the blocks. Dividing the area into blocks has been discuss with reference to FIGS. 5A and 5B, description of which will be omitted herein for clarity.

In step S706, the positioning device may map the trajectories onto the blocks. By mapping the trajectories onto the blocks, the blocks may include a first block corresponding to the first known position, a second block corresponding to the second known position, and a set of third blocks corresponding to the third known positions. In some embodiments, the third blocks may include adjacent blocks of the second block. For example, the adjacent blocks may include four-adjacent blocks of the second block.

It is contemplated that trajectories may pass both first and second blocks and further move to any of the third blocks. Therefore, a probability for a trajectory to pass through each of the third blocks can be different, and can be determined by performing statistics on the trajectories.

In step S708, the positioning device may determine probabilities of the trajectories moving from the second block to each third block. The probabilities may be determined by dividing a number of trajectories passing each third block by a total number of all trajectories.

In step S710, the positioning device may generate the transition model based on the probabilities. The probabilities indicate the possibilities of a terminal device moving to each third block after moving from the first block to the second block. Therefore, a next position (e.g., one of the third blocks) is associated with a previous movement vector from the first block to the second block. The transition model may be established based on the association between the probabilities and the previous movement vector, and stored in a memory. In some embodiments, the transition model may be generated based on the probabilities using a Markov model.

Besides the probabilities, the positioning device may further generate the transition model based on a map of the area. The map may include structural information of the area. An indoor environment, such as a shopping mall, may include stairs, paths, counters, walls, or the like. In some embodiments, stairs may provide references for positioning a terminal device, positions (or blocks) on paths may have higher confidence values, and a trajectory passing through counters and/or walls may be assigned with lower confidence values.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed positioning system and related methods. Other embodiments will be apparent to those skilled in the art from consideration of the specification and practice of the disclosed spoofing detection system and related methods. Although the embodiments are described for indoor positioning as an example, the described positioning systems and methods can be applied to position devices in an outdoor environment with weak GPS signals.

It is intended that the specification and examples be considered as exemplary only, with a true scope being indicated by the following claims and their equivalents.

What is claimed is:

1. A computer-implemented method for positioning a terminal device, comprising:
   determining, by a positioning device, a first position of the terminal device in an area at a first time point;
   determining, by the positioning device, a second position of the terminal device in the area at a second time point;
   determining, by the positioning device, a plurality of hypothetical positions of the terminal device at a third time point; and
   providing, by the positioning device, a third position of the terminal device at the third time point, based on the first position, the second position, and the hypothetical positions using a transition model,
   wherein the method further comprises training the transition model using a plurality of trajectories of existing devices, each of the trajectories including a first known position, a second known position, and a third known position, and training the transition model comprises:
   acquiring the trajectories in the area;
   dividing the area into blocks; and
   mapping the trajectories onto the blocks, wherein the trajectories pass through a first block corresponding to the first known position, a second block corresponding to the second known position, and a set of third blocks corresponding to the third known positions.

2. The method of claim 1, wherein the trajectories are estimated according to Pedestrian Dead Reckoning (PDR) data.

3. The method of claim 2, further comprising receiving the PDR data from at least one of an accelerometer, a gyroscope, an electronic compass, or a barometer of a mobile device.

4. The method of claim 1, wherein training the transition model further comprises:
   determining probabilities of the trajectories moving from the second block to each third block; and
   training the transition model based on the probabilities.

5. The method of claim 4, wherein the third blocks comprise adjacent blocks of the second block.

6. The method of claim 1, further comprising determining a confidence value associated with the first and second positions, wherein when the confidence value is less than a predetermined value, the first and second positions are discarded.

7. The method of claim 1, wherein the third position has a highest probability among the hypothetical positions.

8. The method of claim 1, wherein the trajectories are estimated based on a map of the area.

9. A system for positioning a terminal device, comprising:
   a memory configured to store a transition model; and
   a processor configured to:
   determine a first position of the terminal device in an area at a first time point;
   determine a second position of the terminal device in the area at a second time point;
   determine a plurality of hypothetical positions of the terminal device at a third time point; and
   provide a third position of the terminal device at the third time point, based on the first position, the second position, and the hypothetical positions using the transition model,
   wherein the processor is further configured to train the transition model using a plurality of trajectories of existing devices, each of the trajectories including a first known position, a second known position, and a third known position, and the processor is further configured to:
   acquire the trajectories in the area;
   divide the area into blocks; and
   map the trajectories onto the blocks, wherein the trajectories pass through a first block corresponding to the first known position, a second block corresponding to the second known position, and a set of third blocks corresponding to the third known positions.

10. The system of claim 9, wherein the trajectories are estimated according to Pedestrian Dead Reckoning (PDR) data.

11. The system of claim 10, wherein the processor is further configured to receive the PDR data from at least one of an accelerometer, a gyroscope, an electronic compass, or a barometer of a mobile device.

12. The system of claim 9, wherein the processor is further configured to:
   determine probabilities of the trajectories moving from the second block to each third block; and
   generate the transition model based on the probabilities.

13. The system of claim 12, wherein the third blocks comprise adjacent blocks of the second block.

14. The system of claim 9, wherein the third position has a highest probability among the hypothetical positions.

15. The system of claim 9, wherein the trajectories are estimated based on a map of the area.

16. A non-transitory computer-readable medium that stores a set of instructions that, when executed by at least one processor of a positioning system, cause the positioning system to perform a method for positioning a terminal device, the method comprising:
   determining a first position of the terminal device in an area at a first time point;
   determining a second position of the terminal device in the area at a second time point;
   determining a plurality of hypothetical positions of the terminal device at a third time point; and
   providing a third position of the terminal device at the third time point, based on the first position, the second position, and the hypothetical positions using a transition model,
   wherein the method further comprises training the transition model using a plurality of trajectories of existing devices, each of the trajectories including a first known position, a second known position, and a third known position, and training the transition model comprises:

acquiring the trajectories in the area;

dividing the area into blocks; and mapping the trajectories onto the blocks, wherein the trajectories pass through a first block corresponding to the first known position, a second block corresponding to the second known position, and a set of third blocks corresponding to the third known positions.

\* \* \* \* \*